June 6, 1967

A. LUNA 3,324,422

TEMPERATURE-STABLE INSTANTANEOUS COMPANDER COMPRISING
TEMPERATURE COMPENSATING PARALLEL BRANCHES

Filed Nov. 2, 1964

INVENTOR
AGOSTINO LUNA

BY
ATTY.

United States Patent Office 3,324,422
Patented June 6, 1967

3,324,422
TEMPERATURE-STABLE INSTANTANEOUS COMPANDER COMPRISING TEMPERATURE COMPENSATING PARALLEL BRANCHES
Agostino Luna, Milan, Italy, assignor to Automatic Electric Laboratories, Inc., Northlake, Ill., a corporation of Delaware
Filed Nov. 2, 1964, Ser. No. 407,970
Claims priority, application Italy, Nov. 14, 1963, 23,217/63
1 Claim. (Cl. 333—14)

The present invention relates to instantaneous compressors and associated instantaneous expanders.

As is known, such equipment are suitable for compressing and expanding the dynamics of an electrical signal in some way variable, and in particular impulses modulated in amplitude by a telephone signal. These are used particularly in digital transmission systems in which, because of the closeness of the numeration, there is always a disturbance called quantization noise.

The number of digits employed for the numeration having been fixed, the signal/quantization noise ratio is determined by the maximum signal; reducing the amplitude of such signal diminishes the signal/quantization noise ratio proportionately. The task of the instantaneous compressor used in transmission, associated with the instantaneous expander used in reception, is precisely that of improving the said ratio for weak signals, sacrificing it for strong signals.

It is known from the technical literature that various laws of compression and expansion have been considered (see, for example, B. Smith: "Instantaneous Companding of Quantized Signals," in The Bell System Technical Journal for May 1957), and that which has been considered the most convenient is the law of logarithms.

The curve considered as the optimum having been established, various circuits have been proposed for making an instantaneous compressor (and the associated expander) having a characteristic sufficiently close to that considered optimum (see, for example, H. Mann, H. M. Straube and C. P. Villars: "A Companded Coder for an Experimental Pulse Code Modulation (PCM) Terminal," in The Bell System Technical Journal for January 1962). These known circuits are based generically on nonlinear two-terminal circuits fed by a current or voltage generator accordingly as they constitute respectively a compressor or an expander.

The compression is established by the ratio between the incoming current and the voltage drop in the nonlinear two-terminal circuit, taken as the output signal.

The expansion is established by the ratio between the voltage applied to the nonlinear two-terminal circuit and the current which flows in it, taken as the output signal. The expanders are always circuits complementary to those of the compressor, and therefore are generally constituted of nonlinear two-terminal circuits identical to those used in the transmission. The said nonlinear two-terminal circuits are generally constituted of diodes in series and in parallel with resistors connected in various ways.

At the present state of the art, the said instantaneous compressor-expanders have the disadvantage of requiring a special temperature stabilizing device which provides for maintaining exactly equal the temperature of the nonlinear two-terminal circuit of the compressor and of the nonlinear two-terminal circuit of the expander, to prevent that, otherwise, the two characteristics being no longer complementary, they will give rise to considerable distortion and variation in the equivalent.

The object of the present invention is to provide a compressor-expander in which the characteristic of the nonlinear two-terminal circuit remains practically invariable upon variations of temperature, without recourse to the employment of stabilizing devices.

This is achieved by providing two temperature-compensated nonlinear two-terminal circuits, one for the positive currents and the other for the negative currents, each constituted of a diode in series with a compensating nonlinear two-terminal circuit, this last determining, with the series diode, a point whose potential varies when the temperature changes.

Further features and details of the invention will be described with reference to the accompanying drawings, some of which illustrate the characteristics of known compressors (expanders).

FIGURE 5b shows the electrical schematic of the instantaneous expander, compensated according to the invention, complementary to the compressor of the FIGURE 5a;

To provide a thorough understanding of the operation of the temperature compensated compressor (expander), we will first describe a non-compensated compressor in which the first line of the characteristic of the nonlinear two-terminal circuit is linear, that is, the line corresponding to very small signals. In the literature, this concept of being able to replace a short initial line of the logarithmic characteristic with a straight line has been considered and found acceptable (see, for example, C. O. Mallinckrodt: "Instantaneous Companders," in The Bell System Technical Journal for July 1951).

Figure 1:
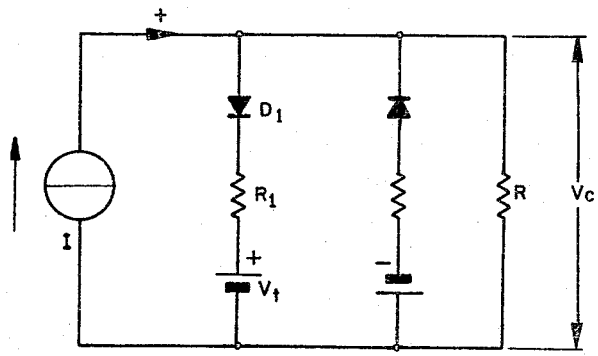
FIGURE 1 shows the electrical schematic of an instantaneous compressor of traditional type.

In the traditional compressor of the FIGURE 1, the symbol I indicates the current generator, in parallel with which are placed the resistor R at the ends of which is taken the output voltage $V_c$, and two branches constituted respectively of a diode $D_1$ in series with a resistor $R_1$ which leads to a source of voltage $V_t$, which polarizes the diode inversely. The two branches are identical, apart from the diode, and they intervene in identical manner, one for the positive currents and the other for the negative currents. The symmetry being granted, the branch involving the positive currents will be described, or rather, the behavior of the compressor during the positive half wave will be considered.

The law of compression is determined by the ratio between generator current I and the voltage $V_c$, which is localized at the ends of the resistor R with the changes in the said current.

Figure 3:
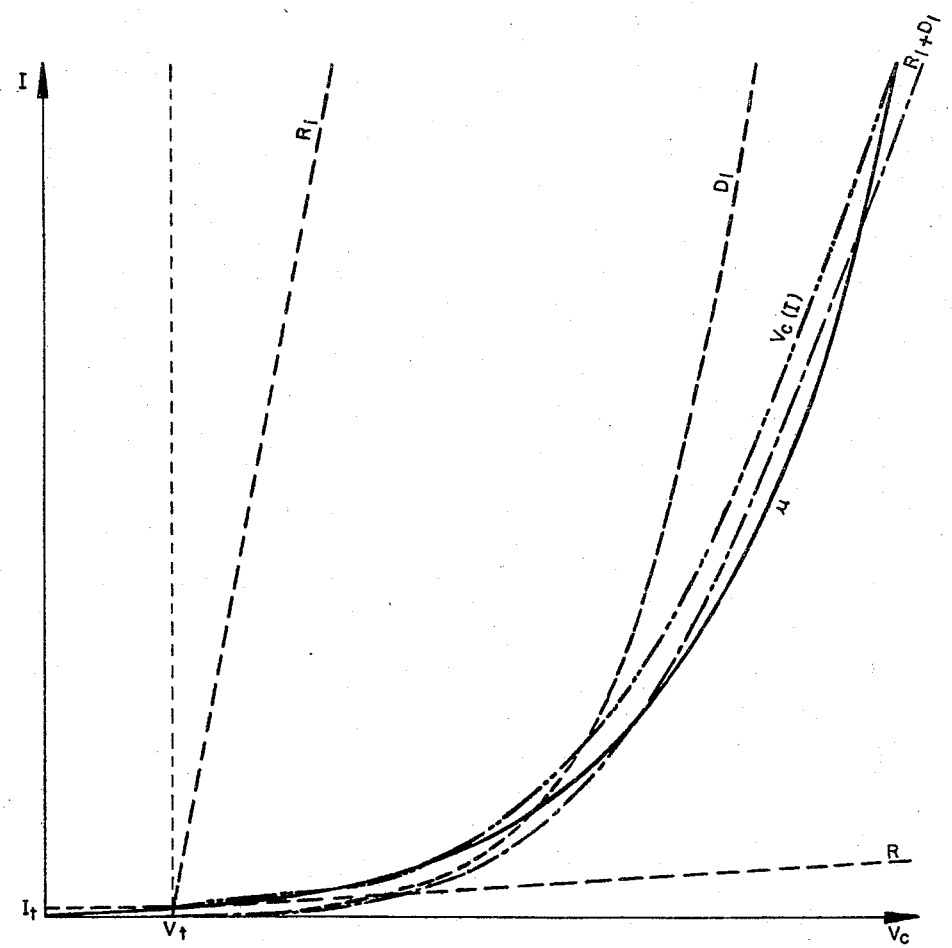
FIGURE 3 represents the characteristics of the compressor of the FIGURE 1.

The operation will be made clear by observing the FIGURE 3.

Starting from the current value of zero, as the current I increases, the voltage $V_c = RI$ increases proportionately, so long as this voltage does not exceed the inverse polarization voltage $V_t$ of the diode $D_1$. Starting from this voltage, which will be appropriately called the transition voltage, the branch constituted of this diode $D_1$ and the resistor $R_1$ also intervenes in the determination of the voltage $V_c$. More precisely, going back, from the value $V_t$ of the abscissa taken as zero, the characteristic of the diode indicated in the figure at $D_1$ and that of the series resistor indicated at $R_1$, we immediately deduce the aggregate characteristic $R_1 + D_1$ of the nonlinear two-terminal circuit, by adding the two voltage drops for each value of current in the branch $R_1 + D_1$. The aggregate characteristic $V_c$ (I) of the compressor is deduced from this last by adding to the current in the branch $R_1 + D_1$ that of the branch, in correspondence with each value of voltage $V_c$. By properly selecting the parameters of the nonlinear two-terminal circuit, the characteristic $V_c$ (I) can be made to approach as closely as possible to the preselected logarithmic characteristic, this last being indicated in the FIGURE 3 by the letter $\mu$.

Figure 2:
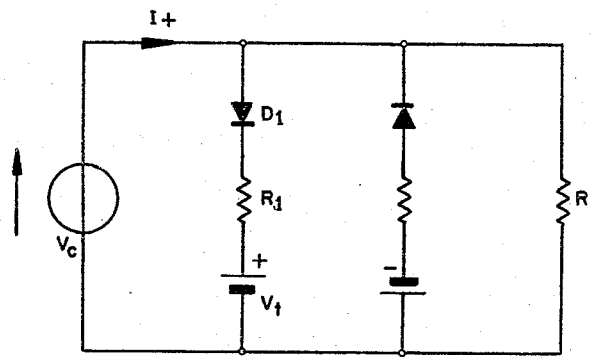
FIGURE 2 shows the electrical schematic of a traditional instantaneous expander, complementary to the compressor of the FIGURE 1.
Figure 5A:
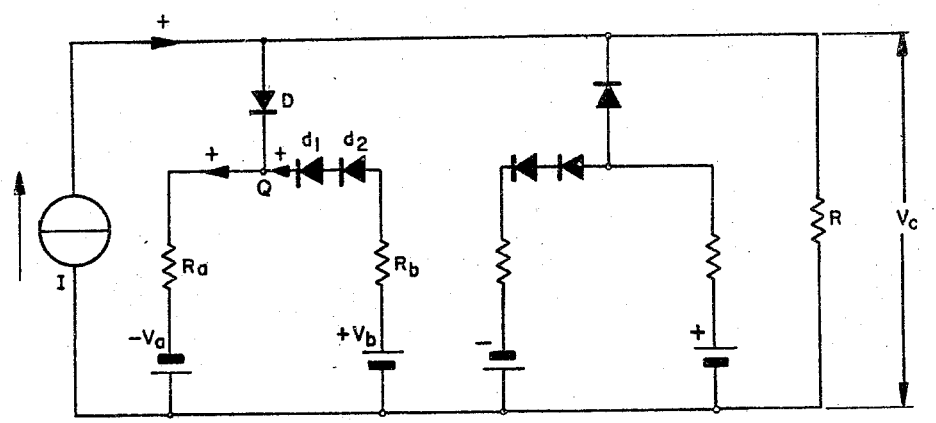
FIGURE 5a shows the electrical schematic of the instantaneous compressor, compensated thermally according to the invention.
Figure 5B:
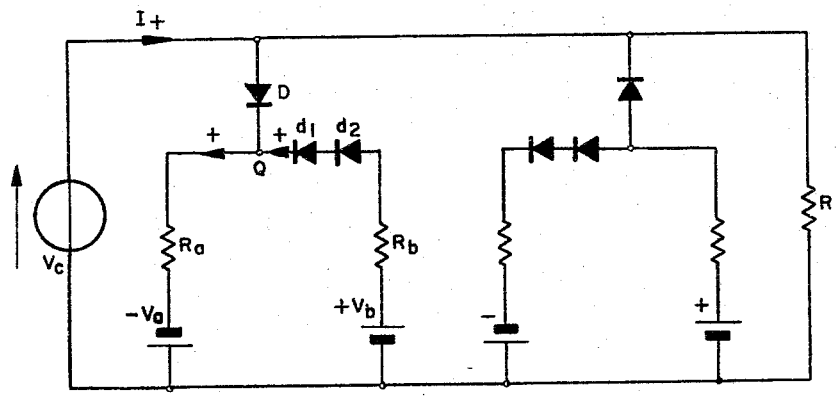
Figures 5C, 6:
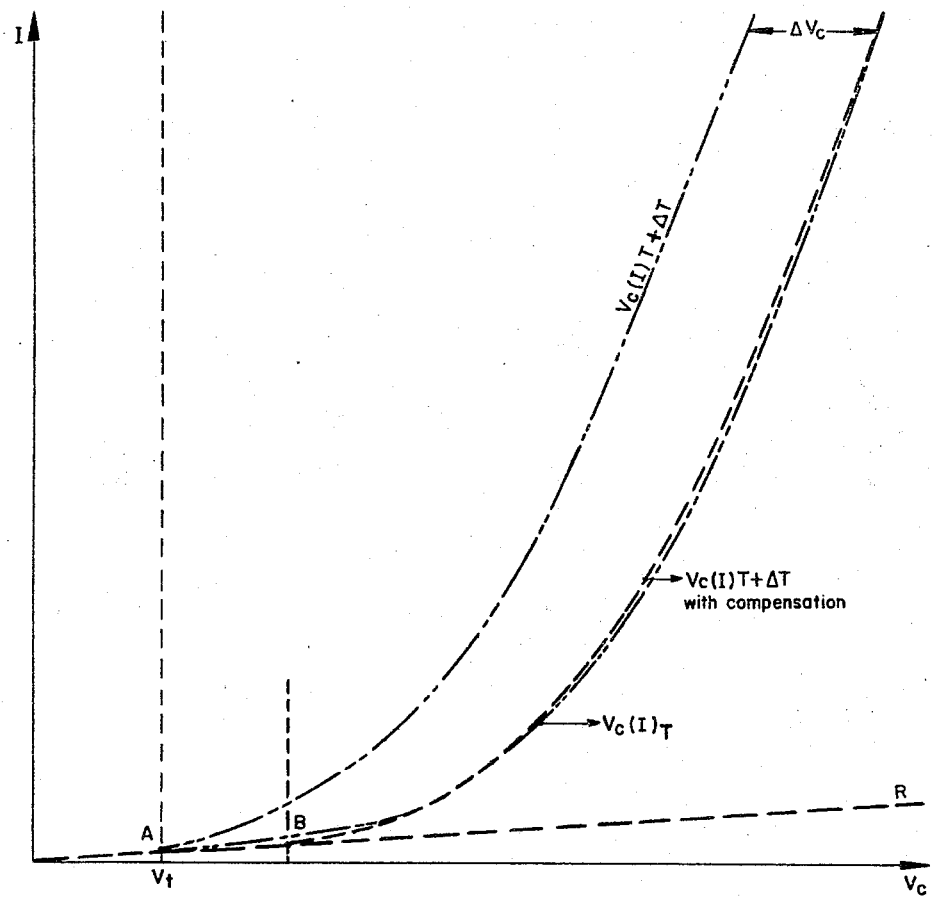
FIGURE 5c shows the compressor of FIGURE 5a and the expander of FIGURE 5b connected in a typical compander circuit.
FIGURE 6 shows the aggregate characteristics of the said compensated compressor and expander of the FIGURES 5a and 5b.

The expander of the FIGURE 2 is identical with the compressor of the FIGURE 1, with the sole difference that this last is fed by a current generator and draws off a voltage, while the first on the contrary is fed by a voltage generator $V_c$, and draws off the current I. As shown in FIGURE 5c, the output of the compressor shown in FIGURE 5a is applied through usual line and repeater circuits to the expander shown in FIGURE 5b to form a complete compander circuit. It is evident, that when the voltage $V_c$ applied to the expander at a receiver is normally made equal to the output voltage of the compressor located in a transmitter which is sending to the receiver, the current I supplied to the nonlinear two-terminal circuit in the expander of the receiver is identical to the current supplied to a similar two-terminal circuit in the compressor of the transmitter.

Figure 4:
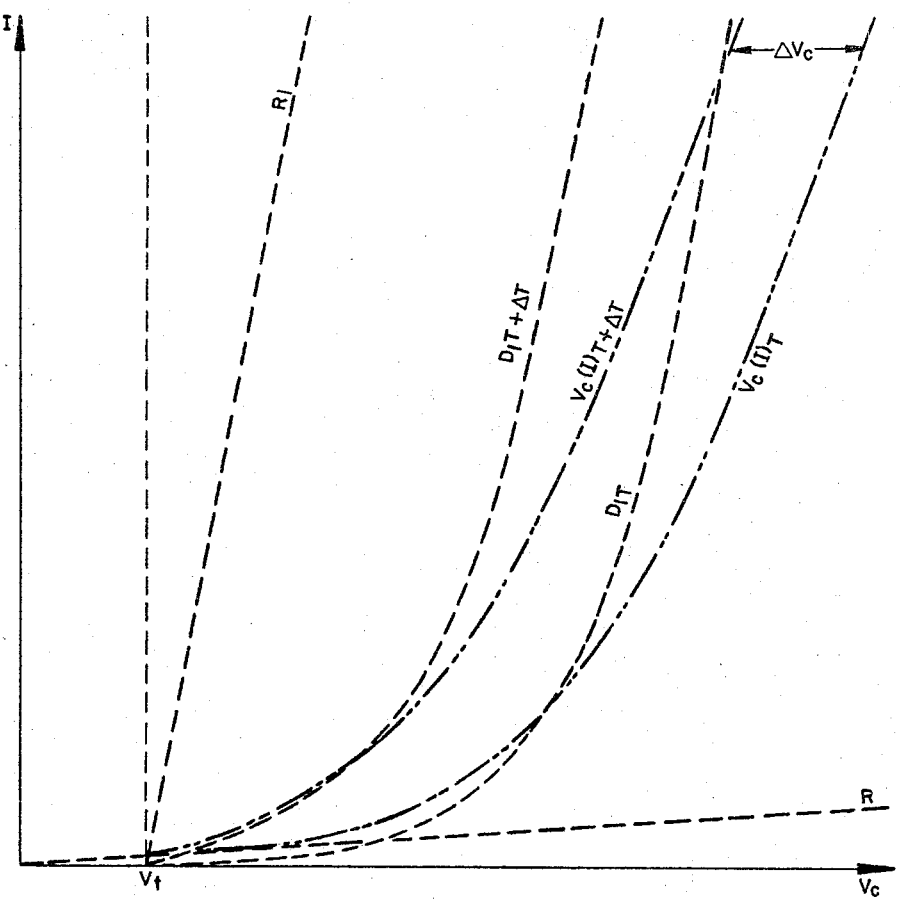
FIGURE 4 represents the characteristics of the said compressor under two conditions of temperature.

Upon variations of temperature, within a few tens of degrees centigrade more or less, with respect to the ambient temperature, it is permissible to consider all of the components stable except the diodes. Upon increases of temperature, it is known that the characteristic of the diodes changes in the sense of presenting, for the same current, a small drop in the voltage as is indicated in the FIGURE 4, in which the characteristic $D_{1T}$ of the diode $D_1$ is portrayed, for a certain temperature, and the same characteristic $D_{1T+\Delta T}$ for a higher temperature. In the same FIGURE 4 is shown how the characteristic of the compressor varies from $V_c(I)_T$ to $V_c(I)_{T+\Delta T}$ solely because of the precited variation in the characteristic of the diode.

It is obvious therefore, that if the characteristic $V_c(I)_T$ has been regulated so as to be identical with that of the expander on reception, upon an increase in the temperature of the transmission and not in that of reception, the characteristic $V_c(I)_{T+\Delta T}$ on transmission will no longer be in accord with the characteristic $V_c(I)_T$ on reception. It is seen, therefore, how the compression characteristic becomes transformed with variations in temperature.

According to the invention, the compensation in the compressor shown in the FIGURE 5a consists in shifting, as a function of the temperature (see the FIGURE 6) the point of transition determined by $V_t$ from A to B, so that the segment $A-B$ is equal to the segment $\Delta V_c$, which represents the shift of the aggregate characteristic of the diode because of the temperature variation $\Delta T$.

In the FIGURE 5a, the symmetry of the two nonlinear two-terminal circuits being again granted, only the branch involving the positive current will be described.

In this figure is shown the current generator I, a parallel resistor R, and two parallel branches each constituted of a diode D in series with the compensation nonlinear two-terminal circuit according to the invention. This last in its turn is composed of two branches in parallel: one formed of a resistor $R_A$ which leads on both sides respectively to a source of potential of $-V_A$ and to a point Q of a potential variable with the temperature, and the other, also connected to the point Q on the one hand and to a potential $+V_B$ on the other hand, formed of the series chain of a resistor $R_B$ and two diodes in cascade $d_1$, $d_2$; the object of using two diodes in series in place of only one, will be explained later.

In the absence of the current I coming from the generator, an even current flows in the ring $+V_B$, $R_B$, $d_1$, $d_2$, $R_A$, $-V_A$, and the point Q assumes a potential $V_T$ which must be positive, since the diode D is blocked.

Figure 7A:
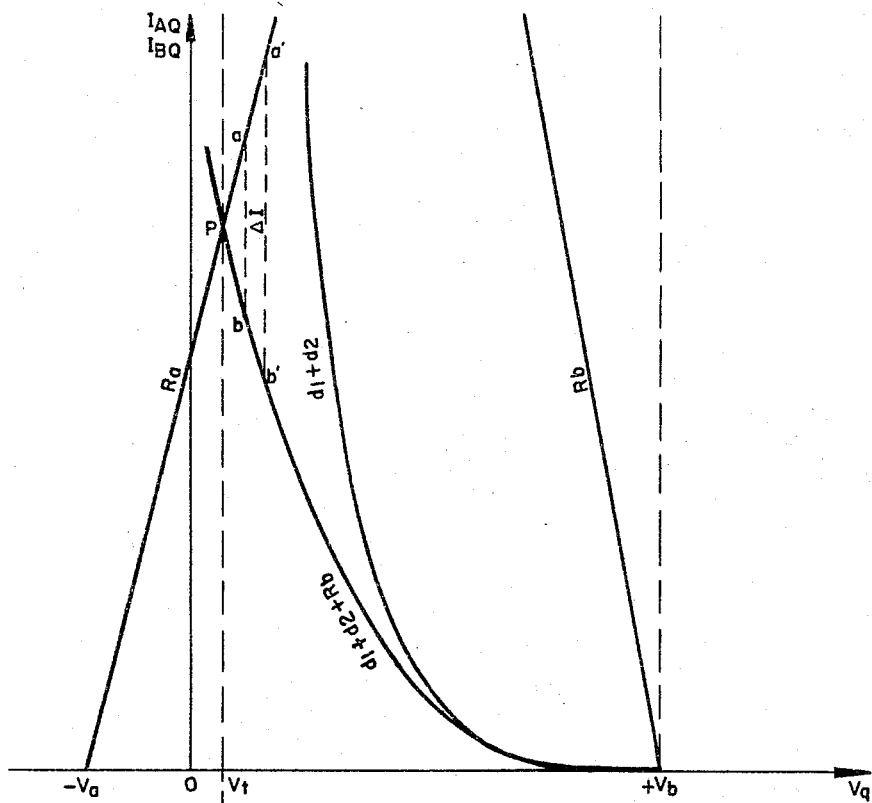
FIGURES 7a and 7b show the characteristics of the compressor and of the expander of the FIGURES 5a and 5b.
Figure 7B:
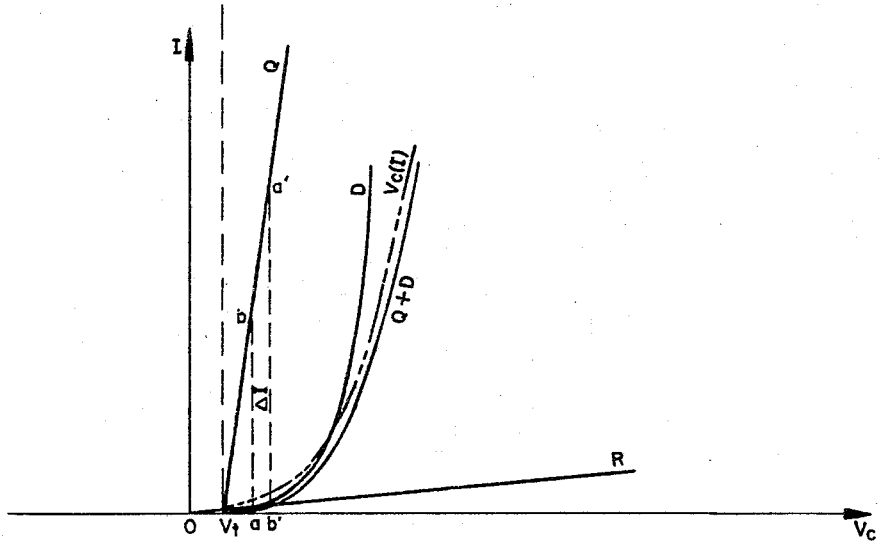

At the outset, with current flowing in the generator, with D blocked, all of this current will flow through the resistor R, giving rise to the characteristic marked R in the diagram of the FIGURE 7b. When the voltage drop in R reaches the transition voltage $V_t$ the diode D is unblocked, and the generator current starts to flow also in the bridged nonlinear two-terminal circuit.

The behavior of the compensating nonlinear two-terminal circuit is represented in the FIGURE 7a; from it can be deduced the movement of the potential of the point Q of the FIGURE 5a, as a function of the current which is flowing in the ring $R_A$, $d_1$, $d_2$, $R_B$, either through the effect of the voltages $-V_A$ and $+V_B$, or through the effect of the current coming from the diode D. When no current passes into the compensation nonlinear two-terminal circuit from the diode D, the current which flows in the two bridged branches is evidently the same, and the characteristics of the precited FIGURE 7a, meet at a point P which determines the transition potential $V_t$ of the compressor. The said two characteristics have obviously given the conventional sign of the currents indicated for the FIGURE 5a.

As soon as the current begins to flow in the diode D, there will be an increase in the current which flows in the branch $-V_A$, $R_A$, Q, for example up to the point indicated by $a$ in the diagram of the FIGURE 7a; with parity of potential at the point Q, the current in the branch $+V_B$, $R_B$, $d_1$, $d_2$, Q would therefore be that marked by $b$ in the same diagram. This means that the segment $\Delta I$ represents the current traversing the diode D; this is illustrated in the diagram 7b, giving rise to a characteristic indicated by Q, which furnishes the movement of the potential of the point Q as a function of the current which flows through D. From the FIGURE 7b it is seen that the diagram relating to the behavior of this compressor is identical with that of the preceding case illustrated in the FIGURE 3, with the sole variant of the substitution of the above defined characteristic Q for the straight line $R_1$.

Figure 8A:
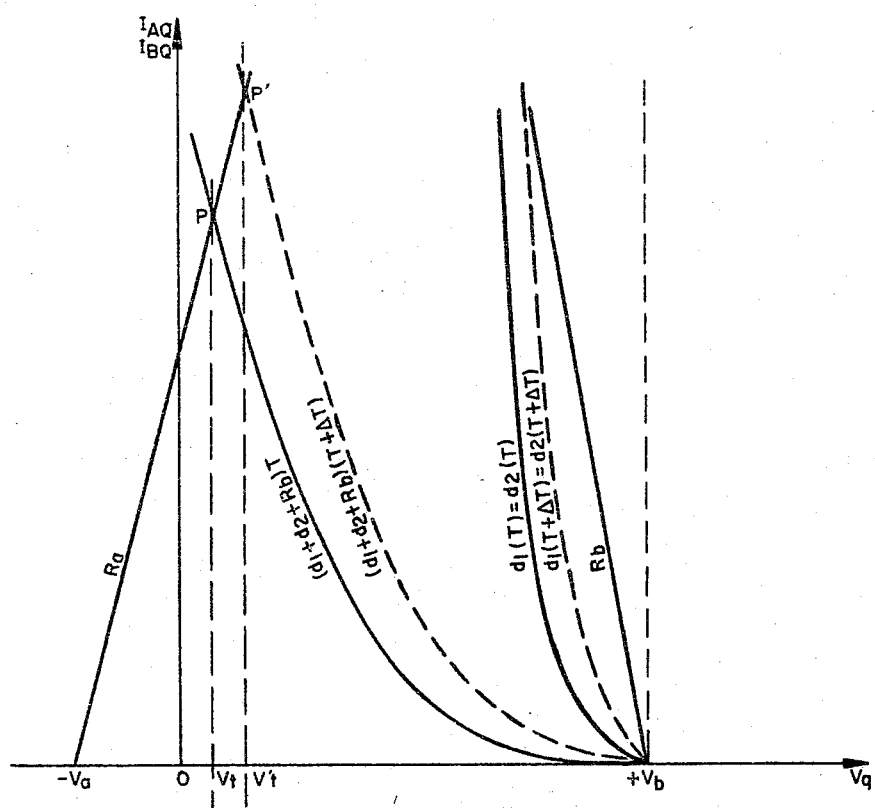
FIGURES 8a and 8b show the characteristics of the compressor and of the expander of the FIGURES 5a and 5b under two conditions of temperature.
Figure 8B:
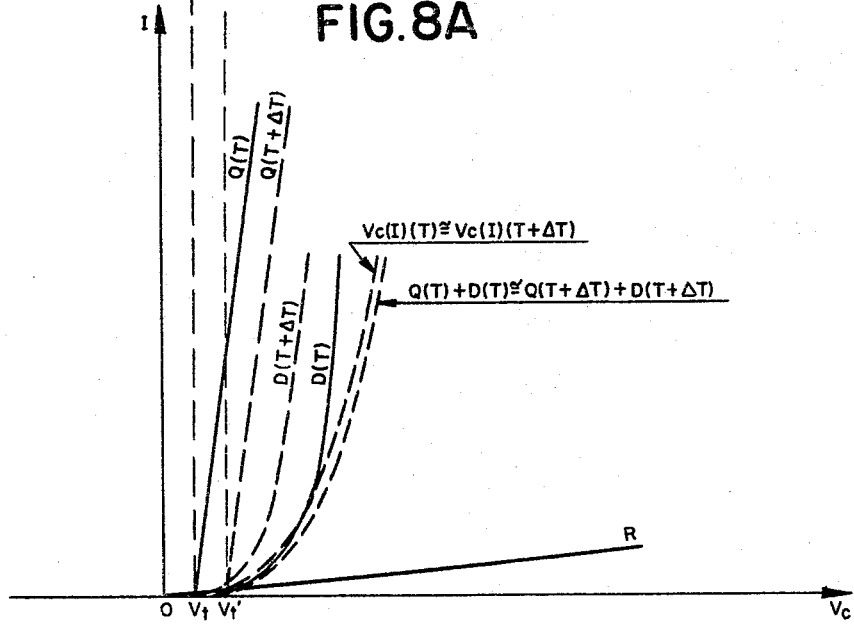

The behavior as a function of the temperature is easily understood by following the FIGURES 8a and 8b, which are derived from the FIGURES 7a and 7b. It will be noted, that through the effect of an increase in the temperature, the characteristic $d_1(T) = d_2(T)$ of the diodes $d_1$ and $d_2$ is transformed into the broken line characteristic which is indicated in the graph by $d_1(T+\Delta T) = d_2(T+\Delta T)$; consequently the aggregate characteristic of the two diodes in series with $R_B$ will pass from that indicated by $(d_1 + d_2 + R_B)T$ to that inidcated by $$(d_1 + d_2 + R_B)(T + \Delta T)$$

which intersects the straight line $R_A$ in a new point P', which determines another value of the transition voltage $V'_t$ more positive than the preceding value $V_t$.

In the FIGURE 8b on the contrary, it is seen how the characteristic Q(T) is transformed into $Q(T+\Delta T)$ through the effect of the precited increase in the temperature, while the characteristic D(T) of the diode D becomes that indicated by $D(T+\Delta T)$. It is noted therefore, that while all of the characteristic of the diode is shifted to the left, the point of transition is shifted by an equal amount to the right, resulting therefore in an aggregate nonlinear two-terminal circuit characteristic of $Q(T+\Delta T)+D(T+\Delta T)$ practically coinciding with the previous one $Q(T)+D(T)$. Consequently, the compressor aggregate characteristic $V_c(I)(T+\Delta T)$ also remains practically invariable with respect to the previous one $V_c(I)(T)$.

After what has been said up to now, it is easily understood, that to be able to obtain the described compensation, it is necessary that the two shifts last seen be equal and opposite. In the case where the compensating diodes $d_1$, $d_2$ are of the same type as the compression diode D, since the potential shift $V_t$ is determined by the projection on the axis $V_Q$ of the points of intersection P and P' of $R_A$ with the characteristics $(d_1+d_2+R_B)T$ and $(d_1+d_2+R_B)(T+\Delta T)$ (see FIGURE 8a), it is clear that the shift to the left of the characteristic of the assembly of the two compensation diodes must necessarily be greater than that determined by the projection of the point P, that is, than the line $V_t-V'_t$, in order for the latter to coincide with the shift of the characteristic of the diode D. This therefore explains the reason why two diodes in series are employed for the compensation, instead of only one.

What is claim is:

An instantaneous compander of the type having a similar nonlinear circuit for a compressor and for an expander, each nonlinear circuit having a pair of parallel circuits with respective first and second diodes, said first and second diodes for each of said nonlinear circuits being connected in opposite senses and each diode having an inverse biasing circuit in series therewith to cause said diodes to function through their transition points and over the low-conductivity part of their characteristic curves;

the improvement comprising temperature compensating first and second parallel branches for each of said biasing circuits, said first branch of each of said biasing circuits having a source of biasing voltage and third and fourth diodes, said second branch having a resistor, said third and fourth diodes within their respective biasing circuits being connected in series in a forward sense relative to their source of biasing voltage to cause current flow therethrough in accordance with their conductivity and the value of said resistor in the respective one of said second branches, and the voltage drop across each of said biasing circuits being for a respective one of said first and second diodes an inverse bias that varies with temperature according to the characteristics of said third and fourth diodes to compensate for similar variations in said transition points of the respective one of said first and second diodes.

References Cited
UNITED STATES PATENTS

| | | | |
|---|---|---|---|
| 2,927,223 | 3/1960 | Meirowitz | 307—88.5 |
| 3,023,355 | 2/1962 | Thorsen | 307—88.5 X |
| 3,067,291 | 12/1962 | Lewinter | 333—14 |
| 3,174,060 | 3/1965 | Schneider et al. | 307—88.5 |
| 3,254,304 | 5/1966 | Barret | 330—24 |

HERMAN KARL SAALBACH, *Primary Examiner.*

ARTHUR GAUSS, S. D. MILLER, P. G. GENSLER,
*Assistant Examiners.*